May 5, 1953　　　O. B. HARTRAMPF　　　2,637,442
SIZE GRADING DEVICE

Filed Jan. 22, 1951　　　　　　　　　5 Sheets-Sheet 1

OTTO B. HARTRAMPF
Inventor

By Smith & Tuck
Attorneys

May 5, 1953

O. B. HARTRAMPF 2,637,442

SIZE GRADING DEVICE

Filed Jan. 22, 1951

OTTO B. HARTRAMPF
Inventor

By Smith & Tuck
Attorneys

OTTO B. HARTRAMPF
Inventor

May 5, 1953 — O. B. HARTRAMPF — 2,637,442
SIZE GRADING DEVICE
Filed Jan. 22, 1951 — 5 Sheets-Sheet 4
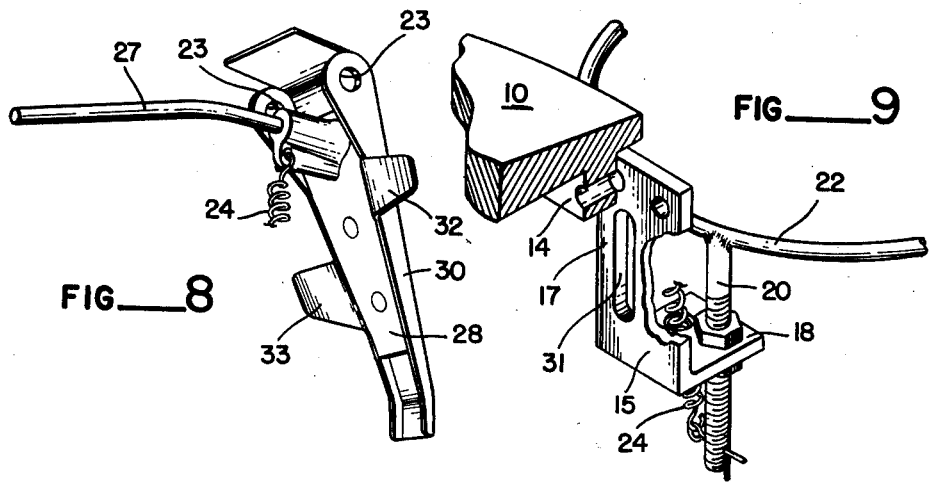
FIG. 8
FIG. 9
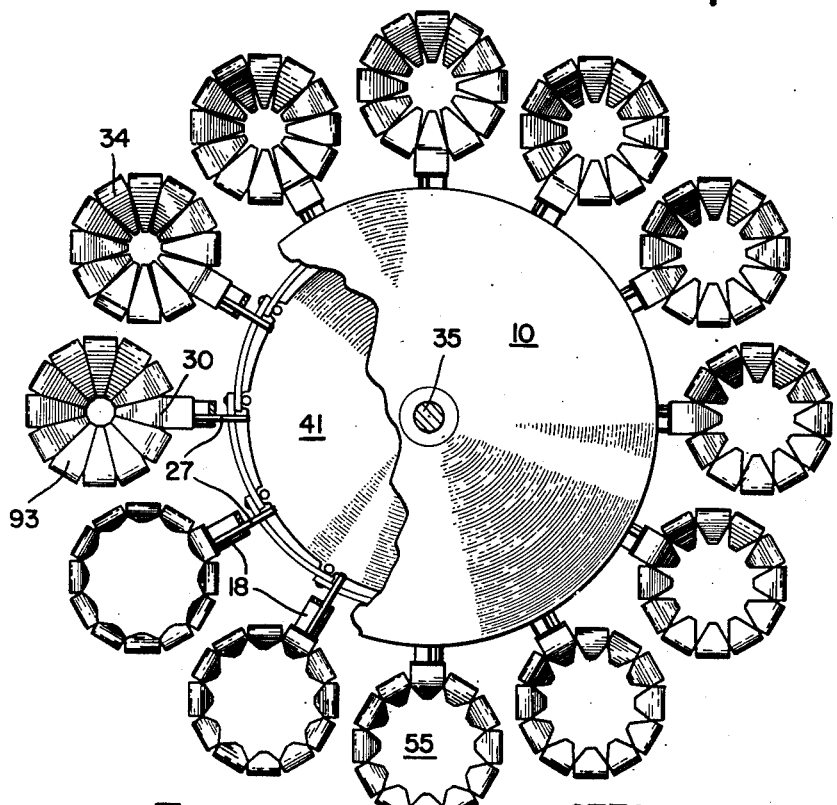
FIG. 7
OTTO B. HARTRAMPF
Inventor
By Smith & Tuck
Attorneys May 5, 1953 — O. B. HARTRAMPF — 2,637,442
SIZE GRADING DEVICE
Filed Jan. 22, 1951 — 5 Sheets-Sheet 5

OTTO B. HARTRAMPF
Inventor

By Smith & Tuck
Attorneys

Patented May 5, 1953

2,637,442

UNITED STATES PATENT OFFICE 2,637,442

SIZE GRADING DEVICE

Otto B. Hartrampf, Hillsboro, Oreg.

Application January 22, 1951, Serial No. 207,072

5 Claims. (Cl. 209—87)

This present invention consists of a plurality of fruit or object-receiving cups which are mounted to revolve in a circle and in their revolution to engage a circular cam which will cause the opening of the leaves forming the cup when acted upon by the cam. In this manner the cup opens progressively until a point will be reached where an object of a certain size will be dropped and in each succeeding cycle of operation an object of the same size will be dropped at the same point. With proper means for feeding this unit and adequate number of belts to carry the objects away from the points of dropping, fruit or other objects can be size graded accurately and, because it is a sequential operation involving a plurality of cups, high speed operation can be obtained.

The cups, each formed of a plurality of intermeshing leaves, have been made the subject matter of my Patent No. 1,680,880 and minor variations of this form are shown in my copending application Serial No. 119,116. In this present machine, however, the mechanical means has been greatly simplified so that size grading devices of this type will be commercially available to the small ranch owner.

The handling of fruit on a profitable basis has always been a very difficult problem due largely to the fact that so many of the operations have in the past been manually undertaken. It naturally follows that when one rancher has fruit ripened ready for picking and packing that many other ranchers in the same general locality will be in a similar position. Consequently the supply of labor to handle the fruit has always been a very difficult problem. In the past many devices have been provided to assist in the size grading operation. However in order to handle the large volume that must be handled in relatively short periods the machines available up to the present have generally been of an expensive, complicate character which in turn limited their purchase and use to those ranchers having adequate finance and normally large acreage. The small ranchers, the ranch small enough to be operated except for peaks by a single family, have not been able to avail themselves of any of the size grading equipment that has been obtainable and it is to supply this general market that this device has been produced. It follows naturally that if a large volume is to be handled on a large ranch then the needed capacity can be achieved by increasing the number of individual units so employed and such modifications as are necessary to employ a number of these devices practically are a definite part of this present application.

The principal object of this present invention is to provide a size grading device so constructed that it can be manufactured and sold at a sufficiently low price so that the equipment will be readily available to the small operators.

A further object of this invention is to provide a size grading device that will be equally operable on various types of fruit or other objects that may be desirable to size grade and to provide this grading in a sequential operational arrangement so that a relatively large volume can be passed through the machine within a given period.

A further object of this invention is the provision of means whereby a single sorting table can be used as the feeding station for a plurality of size grading devices made after the teachings of this invention.

A further object of this invention is to provide a cam means for the sequential opening of the grading cup which cam means is readily adjustable so that a wide variation in the size of items to be graded can be achieved and further that the time required for the grading operation can be varied so that two or more delivery points may be provided for items of the same grade size.

A further object of this invention is to provide a unique belt conveyor means so that with the minimum of driving equipment fruit may be carried away from the grading device proper in opposite directions in the same belt trough.

A further object of this present invention is to provide means for engaging fruit or other objects and for releasing the same without applying pressure to them and not subjecting the same to shock or falling where bruising or other damage might be incurred.

Further objects, advantages and capabilities will be apparent from the description and disclosure in the drawings, or may be comprehended or are inherent in the device.

Figure 4:
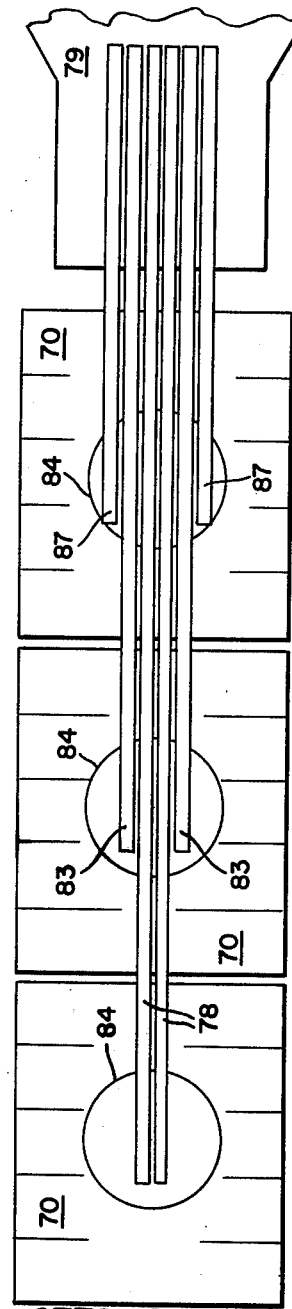
Figure 5:
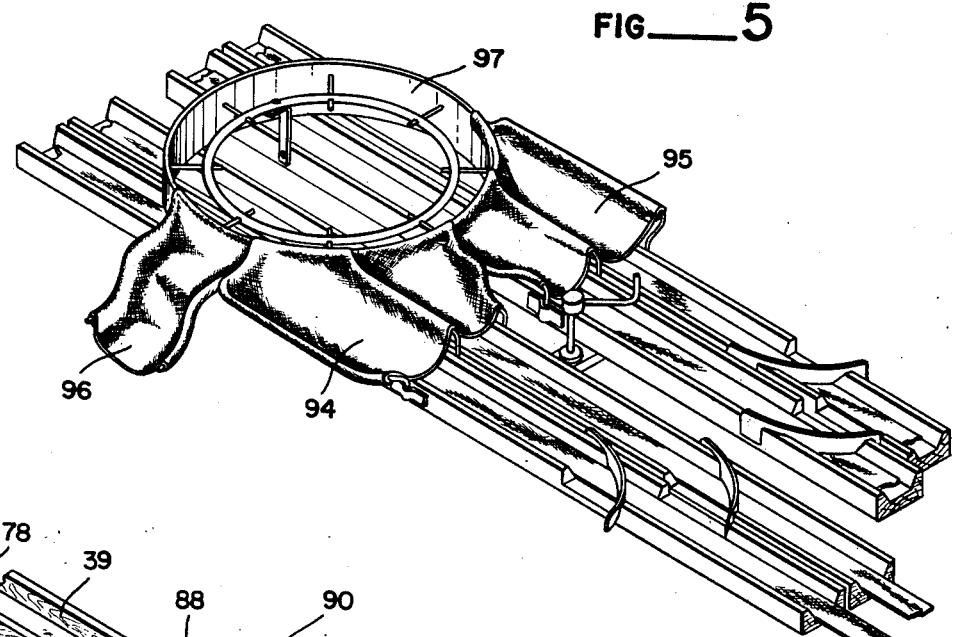
Figure 6:
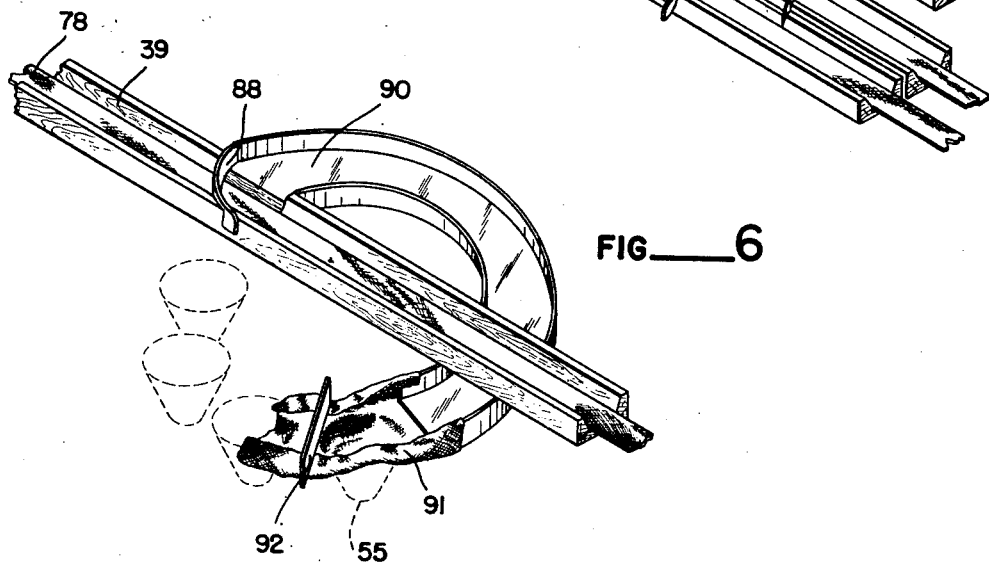
Figure 10:
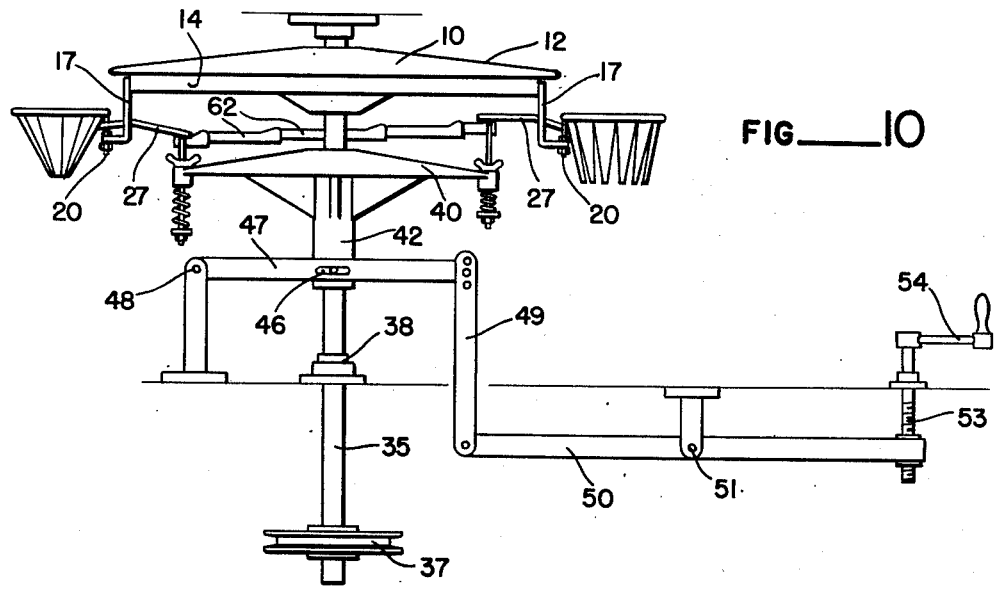
Figure 11:
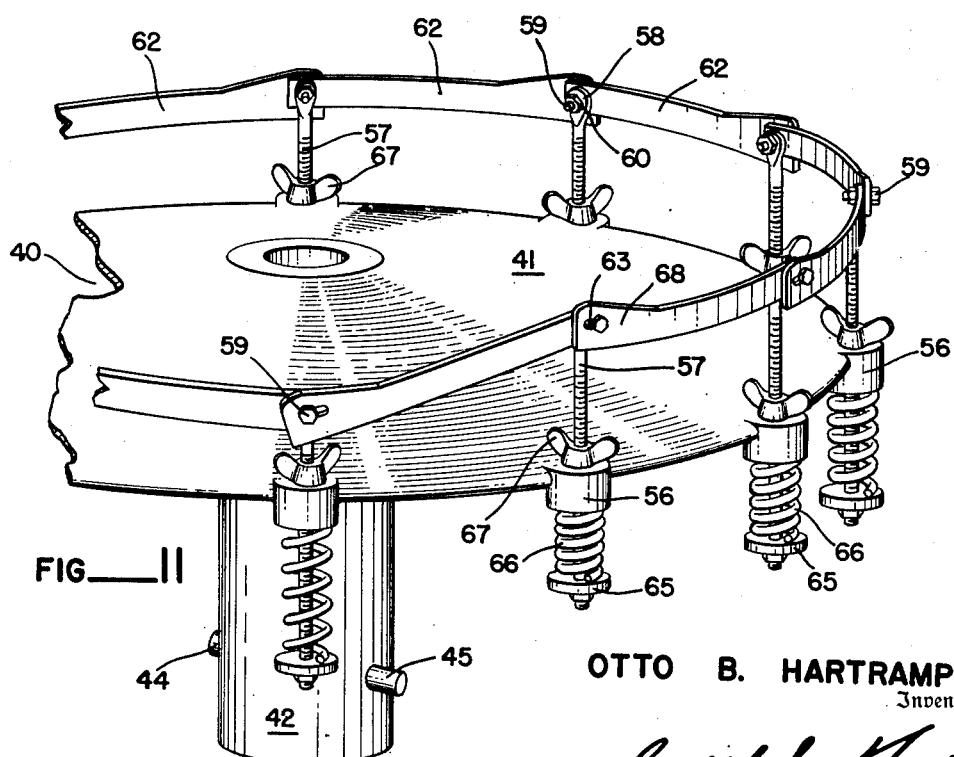

3 tion of this size grading device showing the same in its simplest form of embodiment;

Figure 4 is a diagrammatic top plan view illustrating the belt conveyors used where a plurality of sizing cup units are fed from a common sorting table;

Figure 5 is a perspective view taken from a raised point of view showing the distribution means employed to catch the fruit or objects which have been size graded by the cup assembly, which has been removed from the showing;

Figure 6 illustrates the feed means employed to transfer the fruit from the feed conveyor to the grading cup, the latter being shown in dashed lines; the entire figure being a perspective view in the same general sense as Figure 5, but in fragmentary form;

Figure 7 is a top plan view of the size grading cup assembly showing the cups in their different stages of opening. For sake of simplicity this view is taken as though the equipment were lifted off the machine and set aside but showing the associated position of the circular cam used with the device;

Figure 8 is a perspective view taken from a low position showing the attachment of the cam-engaging arm to the underside of the cup leaf;

Figure 9 is a perspective view, partly in section, showing the mounting bracket employed to support each of the sizing cups and illustrating the vertical channel through which the cam-engaging arms is positioned;

Figure 10 is a fragmentary, diagrammatic vertical sectional view through the cup-supporting and operative means of this device;

Figure 11 is a fragmentary perspective view, partly in section, showing the means for supporting and adjusting the track-like operating cam.

Referring more particularly to the disclosure in the drawings, the numeral 10 designates the cup supporting means. This may take any preferred form, however, it can easily be made as a casting or built up of welded together sheet stock so as to provide a slightly conical upper surface 12 and a downwardly extending rim 14 adapted to form a seat for a plurality of cup-supporting brackets 15. The cup-supporting brackets are provided in angular form having the vertical member 17 adapted to be fixedly secured to rim 14 of support 10 as by a plurality of rivets or bolts passing through appropriate holes in the upper ends of the same. The lower end of bracket 15 is a substantially horizontal portion 18 which is pierced with a hole to provide for the adjusting rods 20 which form the adjustable positioning support members for the cup loops 22.

The various sizing cups best illustrated in Figure 7 are each secured to the cup supporting member or table 10 through the expedient of having the various leaf members, forming the cups, threaded on loops 22 by means of the holes 23 provided in the side ribs of the individual leaves. The cup leaf actuating rod 27 is fixedly secured to a bracket member 28 which in turn is itself fixedly secured to leaf 30. Rod 27 extends through and is guided by slot 31 in bracket 15. Each of the additional leaves required for each sizing cup is provided with interlocking lugs as 32 and 33 consequently any movement of the master leaf 30 will cause a similar movement in all the various other leaves 34 of the cup. Springs 24 are used to urge the leaves to the closed position.

Table 10 is secured to and revolves with the vertical, revolvable shaft 35. This shaft may be driven by any convenient means as the electric motor 36 driving through suitable belts to the grooved pulley 37. A suitable bearing and thrust collar arrangement is provided at 38 so as to position shaft 35 vertically and to accept the weight of the supporting mechanism as the shaft is revolved.

Encircling shaft 35 and held against revolving with it is the cam support apron 40. This unit has an upper disc-like surface 41 and a downwardly extending sleeve 42 which is adequately strengthened and secured to plate 41. Near its lower end, sleeve 42 is provided with outstanding detents 44 and 45. These detents are engaged within companion slots 46 in the two spaced bars 47. Bars 47 are secured at one end to a fixed pivot as 48 and the other end is connected by link 49 to a lever 50 which is connected to a fixed pivot 51 and is adjustably positioned about the same by means of screw 53 which in turn is controlled by the crank and handle 54. This arrangement makes it possible to raise and lower plate 41 and the cam assembly which it carries. Thus the cam can be positioned vertically to give a means of quickly controlling or varying the amount of opening for each of the sizing cups 55.

Disposed about the periphery of plate 41 are a plurality of lugs 56 which have considerable height so that when through drilled they will give appreciable guiding and stability to the cam support and adjustment rods 57. Each rod 57 is preferably formed as with an eye in its upper end 58 which is threaded for a bolt 59 which bolt can be locked in place by means of lock member 60. Pivotally supported on bolts 59 are two overlapping ends of adjacent cam members 62. These cam members are all similar in structure and are provided at one end with a slotted opening 63 so that reasonable changes in angularity of the cam members can be provided and thus cause the cups 55 to open and close in any desired pattern. The lower ends of rod 57 extend down through lugs 56 and terminate in a washer 65 secured in place as by a nut or cotter pin. This washer 65 forms a seat for the compression spring 66 which is compressed by winged nut 67. This arrangement provides a very convenient means of changing the vertical position of any of the bolts or cam screws 57 merely by the adjustment of a single winged nut 67. Whenever the adjustment is achieved spring 66 maintains the same. One end of each of members 62 is enlarged vertically at 68. It is to be noted that the hole in the small end of members 62 and the slot 63 in the large end are centered vertically in each end consequently a downward slope is provided for the upper surface of members 62 and when arm 27 rides over the raised portion 68 it causes the fruit to drop at one of such points. This centers the fruit in one of the conveying chutes.

Figure 1:
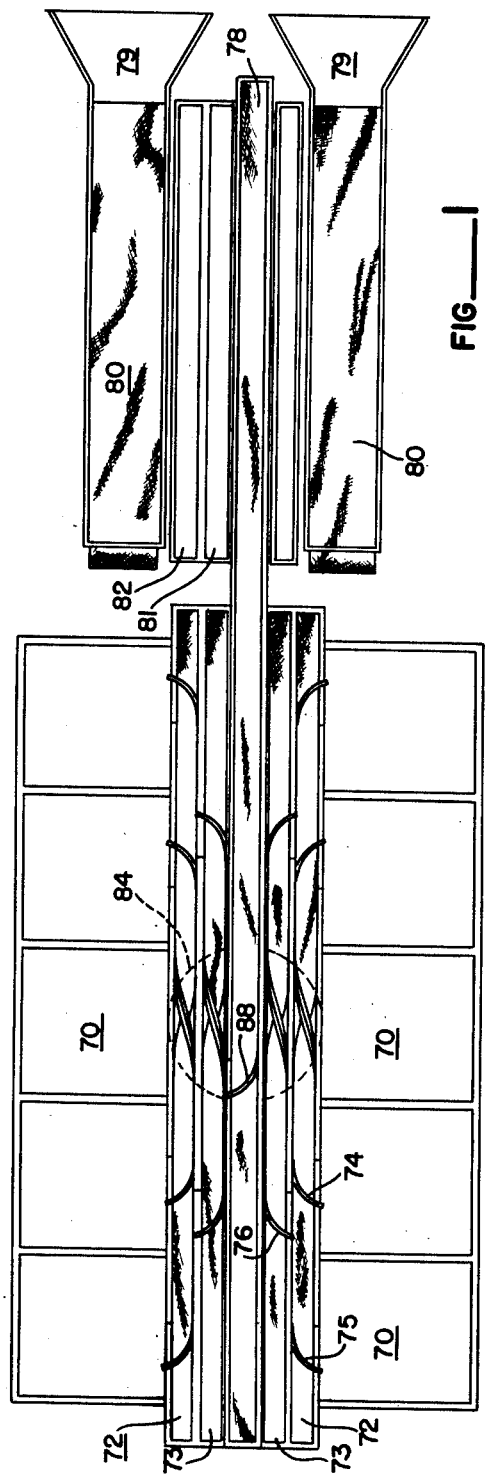
Figure 1 is a top plan view of a size grading device made after the teachings of this present invention and showing the simplest embodiment form thereof.
Figure 3:
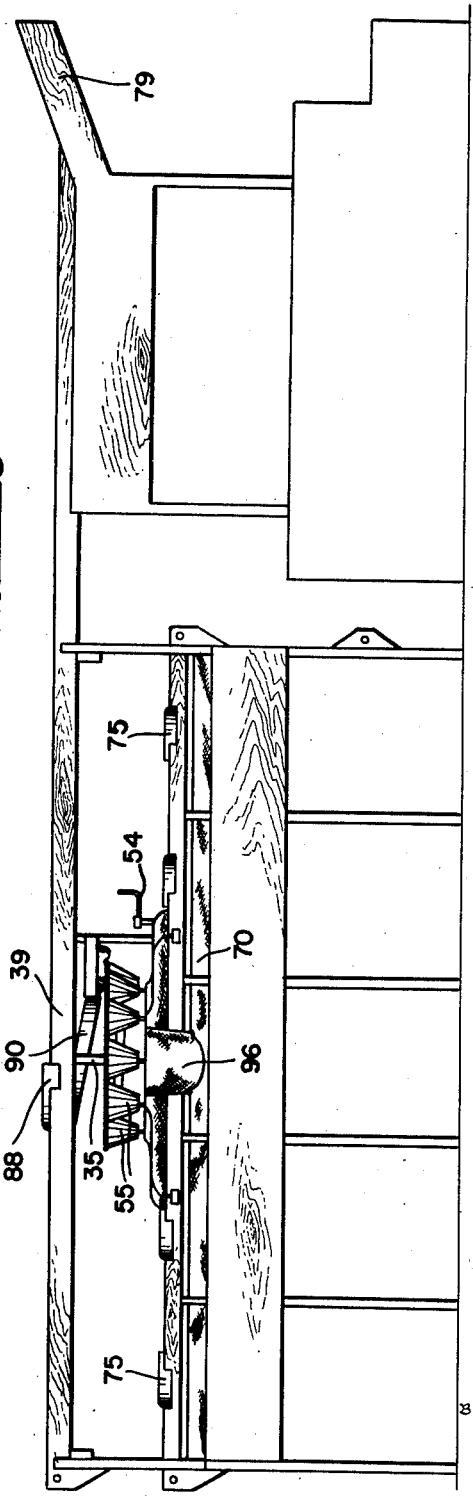
Figure 3 is a side elevation of a typical installa- 2,637,442

In Figures 1 and 3 I have illustrated one of the preferred and simplest arrangements for employing my sizing equipment. It is desirable to provide that the fruit will be finally deposited in bin 70 at a height that will be convenient for the packer. A preferred height is approximately waist-high and this basic requirement means that the sizing and distributing means must be placed sufficiently above this level so that gravity can be employed in part for the handling of the fruit.

Figure 2:
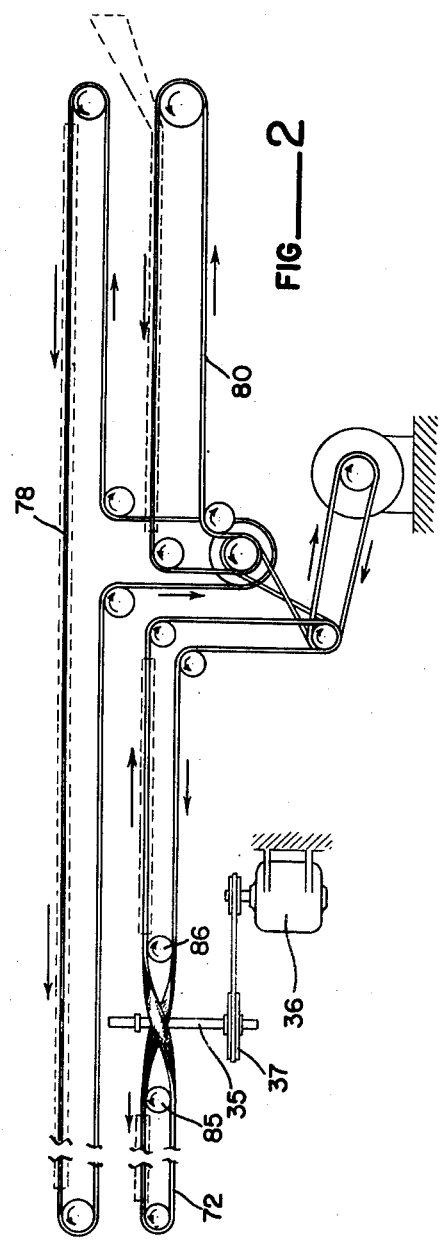
Figure 2 is a side elevation simplified to the point where it is almost diagrammatic, showing the typical belt-driving means employed with this device.

Figure 3 is laid out on this principle so that the sloping canvas bottoms of bins 70 are supported on an adequate framework so that the fruit will roll down to the outside of the bins for easy reaching by the fruit packer and at the same time sufficient space be provided so that resilient tension means may be employed to maintain a reasonable tautness in the canvas bottom. Disposed above the higher end of bin 70 are a plurality of distributional belts as 72 and 73 which occur, normally, in duplicate on each side of the machine. Baffles are provided on the belts as at 74, 75 and 76 so that the fruit can be shunted into the appropriate bin 70. A means supply as belt 78 brings the fruit from the sorting tables which are disposed at the right hand side as shown in the various views. Here the fruit is deposited through spouts 79 onto the large sorting shelves 80. Here operators sort out defective fruit or second quality fruits which are placed on belts 81 and 82 respectively for disposal and the prime fruit is placed by hand upon belt 78 where it is carried over to the sizing head shown in Figure 1 by the dashed lines 84. One form of belt drive means which has proved very effective with this equipment is shown in Figure 2. The crossing of belts between rollers 85 and 86 makes it possible to deliver fruit both ways from the sizing unit.

The distribution of the fruit from supply belt 78 is illustrated in its simplest form in Figure 6. Here a baffle is provided as at 88 which shunts the fruit off of belt 78, through an opening in the guide trough 39, onto the inclined spout 90. The fruit descends under urge of gravity down spout 90 and comes to rest on the flexible end portion 91 of the same. This portion is preferably made of flexible cloth or like material and the cups 55 as they revolve underneath this cloth strip engage the fruit that has been arrested by baffle 92 underneath the cloth and carry the fruit properly supported by the cloth until the end of the spout is reached where the fruit will be gently deposited in cups 55.

The fruit is carried by the cups which start to open after the showing of Figure 7 and the fruit is dropped at some predetermined point. When the fruit is released by cup 55 it is deposited again on a resilient chute. One form of such chute is shown in Figure 5. It is desirable that fruit-receiving chutes 94, 95 and the like be of resilient material. This may be fabric or papier-mache or any other suitable material. The chutes form guide means where the fruit under urgence of gravity passes down into one of the various conveyor belts and if it should be for the bin 70 immediately opposite from the sizing device it will be passed out through chute 96 directly into an appropriate bin 70.

Generally throughout the showing in the drawings the simplest form of the invention has been illustrated. However there are occasions where maximum output is desired and, to facilitate this, means such as shown in Figure 4 in diagrammatic form may be employed. Here a plurality of sizing units 84 are disposed in such an arrangement that each of the outer units is supplied by belts which pass over the intermediate units so that the fruit can be conveniently deposited in spouts 79 and a single elongated sorting table feed a plurality of supply belts. To further increase the amount of fruit that can be handled under those circumstances where only a relatively few different sizes are required, I have illustrated two feed belts for each of the sizing turntables 10, as 78, 83 and 87. This will call for a revision of the feed spout 90 shown in Figure 6 in that two of the units should be employed, one for each side of the machine and they will then be shorter in length so that there will be no interference between the two. Further to speed up the operation it is quite common to have both sides of the sizer support drum 97 supplied with trough or chute members as 94 and 95. This arrangement is essential to follow out the showing of Figure 1. It is desired to point out, however, that my sizing equipment lends itself to many arrangements and it is very flexible in design. However because of the large number of design possibilities only a preferred arrangement has been shown throughout the drawings.

*Method of operation*

In using this present equipment the fruit or objects to be size graded are supplied through chutes 79 which deposit them on the sorting belts 80. The belts are employed in order that a number of hand sorters can stand in position before the same. Here defective and sub-grade fruit are elimintaed and placed on belts 81 and 82 for other disposal. The packable fruit is placed upon the feed belt 78 of Figure 1 or on any of the various belts 78, 83 and 87 shown in Figure 4, it being desirable that a uniform flow of fruit be provided however and this will call for some judgment on the part of the sorters. As the fruit progresses out the conveyor belt, it is deflected by baffle 88, which will direct it into the inclined spout or spouts 90. In the showing of Figure 4 is it to be understood that there will be two such baffles in use and two spouts 90. The fruit is then picked up off the flexible end of spout 90 as shown at 91 and deposited in cups 55 that are in the closed position substantially as will be noted at 93 in Figure 7. The fruit is then carried around the circle, or in the case of a dual fed unit, half way around the circle, with the cup gradually opening and when the point has been reached where the fruit can slip through the cup it will come to rest on one of the various distributing spouts 94, 95 or 96. The exact position at which the fruit will drop will be in keeping with the adjustment of the circular cam made up of members 62, with the exact point determined by the upgrade of the cam members at 68, as an expedient to insure that the fruit will drop near the centerline of the chute instead of on one of the chute margins. A study of Figure 11 will indicate that members 62 may be positioned to form two cams to complete the circle as is desirable when two feed belts are used after the showing of Figure 4.

There are some conditions where it may be desirable to upgrade or downgrade the fruit while the sorting operation is in progress. This is achieved by raising or lowering the entire cam assembly, controlled by crank 54, by the means illustrated in Figure 10, to the end that the cam as a whole be raised or lowered and cause the cups to open or close to a degree slower or faster. Thus a certain delivery spout as 94 for instance might then begin to deliver fruit slightly oversize or slightly undersize from that which the machine had heretofore been delivering.

When the fruit is delivered to the various conveyor belts as 72 and 73, it is conveyed to predetermined bin 70 so that a packer having a position adjacent one of these bins will be supplied with fruit all of a uniform size and thus the prime purpose of the equipment is achieved.

It is believed that it will be clearly apparent from the above description and the disclosure in the drawings that the invention comprehends a novel construction of a size grading device.

Having thus disclosed the invention, I claim:

1. A size grading device, comprising: a supporting member; a vertical shaft journaled in said supporting member; power means for rotating said shaft; a horizontally-disposed, circular cup-supporting member fixedly secured to the upper portion of said vertical shaft to rotate therewith; a multiplicity of grading cups spaced and radially disposed about the perimeter of said cup-supporting member, each cup having a ring disposed horizontally and a plurality of conjointly operating leaves depending therefrom; spring means connected to said leaves tending to move them to a closed position; a horizontally-disposed, circular cam-supporting member positioned on said shaft below said cup-supporting member in a manner permitting rotation of said shaft with relation to said cam-supporting member; manually operable elevating means connected to said supporting member and said cam-supporting member for adjusting, during operation of the grading device, the vertical position of said cam-supporting member as a unit; a multiplicity of vertical cam-supporting bolts disposed about the perimeter of said cam-supporting member; means for adjusting the vertical position of each cam-supporting bolt; a multiplicity of cam rails; each of said cam rails being disposed between two of said cam-supporting bolts and pivotally connected at its ends to said two bolts; a leaf actuating arm connected at one end to a master leaf on each of said grading cups, the other end of said actuating arm extending above said cam rails and riding thereon for opening said grading cups.

2. The subject matter of claim 1 in which there is a series of resilient fruit-receiving chutes positioned under said grading cups and generally radially disposed in relation to said shaft, at spaced intervals, to receive graded articles descending from said grading cups and to direct them away from said shaft and said cam rails having portions of sharply upward slant spaced to match said fruit-receiving chutes and positioned so that said grading cups will be directly above said fruit-receiving chutes when said actuating arms strike said portions of sharply upward slant.

3. A size grading device, comprising: a supporting member; a vertical shaft journaled in said supporting member; a horizontally-disposed, circular cup-supporting member positioned on said vertical shaft; means for rotating said cup-supporting member; a series of grading cups spaced and radially disposed about the perimeter of said cup-supporting member, each cup having a ring disposed horizontally and a series of conjointly operating leaves depending therefrom; spring means connected to said leaves tending to move them to a closed position; a horizontally-disposed cam-supporting member positioned on said shaft below said cup-supporting member; manually operable elevating means for adjusting, during operation of the grading device, the vertical position of said cam-supporting member as a unit; a series of vertical cam-supporting links disposed about the perimeter of said cam-supporting member; means for adjusting the vertical position of each cam-supporting link; a series of cam rails; each of said cam rails being disposed between two of said cam-supporting links and pivotally connected at its ends to said two cam-supporting links; a leaf actuating arm connected at one end to a master leaf on each of said grading cups, the other end of said actuating arm extending above said cam rails and riding thereon for opening said grading cups.

4. The subject matter of claim 3 in which there is a series of fruit-receiving chutes positioned under the path of travel of said grading cups ats spaced intervals and said cam rails having portions of sharply upward slant spaced to match said fruit-receiving chutes and positioned so that said grading cups will be directly above said fruit-receiving chutes when said actuating arms strike said portions of sharply upward slant.

5. A size grading device for fruit, comprising: a supporting member; a vertical shaft supported by said supporting member; a horizontally-disposed annular cup-supporting member positioned on said vertical shaft; means for rotating said cup-supporting member; a series of grading cups spaced and radially disposed about the perimeter of said cup supporting member, each cup having a ring disposed horizontally and a series of conjointly operating leaves depending therefrom; a horizontally-disposed cam-supporting member positioned below said cup-supporting member; manually operable elevating means to adjust, during operation of the grading device, the vertical position of said cam-supporting member as a unit; a series of vertical cam-supporting links disposed about the perimeter of said cam-supporting member; a series of cam rails; each of said cam rails being disposed between two of said cam-supporting links and pivotally connected at its ends to said two cam-supporting links; means for separately adjusting the height of said cam rails at each point of connection with said cam-supporting links; a leaf actuating arm connected at one end to a master leaf on each of said grading cups, the other end of said actuating arm extending to move along said cam rails for opening said grading cups.

OTTO B. HARTRAMPF.

References Cited in the file of this patent

UNITED STATES PATENTS

| Number | Name | Date |
| --- | --- | --- |
| 1,680,880 | Hartrampf | Aug. 14, 1928 |
| 2,522,917 | Zondagh | Sept. 19, 1950 |

FOREIGN PATENTS

| Number | Country | Date |
| --- | --- | --- |
| 800,616 | France | July 15, 1936 |